United States Patent [19]

Yamane et al.

[11] Patent Number: 5,706,305
[45] Date of Patent: Jan. 6, 1998

[54] GAS LASER OSCILLATING APPARATUS FOR DISCHARGING LASER BEAM BY EXCITING GAS WITH MICROWAVE

[75] Inventors: Shigeki Yamane, Kobe; Doukei Choo, Amagasaki; Yoshiaki Takenaka, Osaka, all of Japan

[73] Assignee: Matsushita Electric Industrial Co., Ltd., Osaka, Japan

[21] Appl. No.: 669,806

[22] Filed: Jun. 27, 1996

[30] Foreign Application Priority Data

Jun. 27, 1995 [JP] Japan ................... 7-160412

[51] Int. Cl.$^6$ ........................... H01S 3/097
[52] U.S. Cl. ................. 372/82; 372/34; 372/92; 372/61
[58] Field of Search .............. 372/82, 34, 55, 372/92, 58, 61, 69, 93

[56] References Cited

U.S. PATENT DOCUMENTS 5,450,435  9/1995  Yamane et al. .............. 372/82
5,606,571  2/1997  Furuya et al. .............. 372/82

FOREIGN PATENT DOCUMENTS 1-262681  10/1989  Japan .
4-14272   1/1992   Japan .

OTHER PUBLICATIONS

Hoffman, Hugel, et al. "CW Carbon Monoxide Laser with Microwave Excitation in the Supersonic Flow", *Applied Physics Letter*, 37, Oct. 15, 1980.

*Primary Examiner*—Leon Scott, Jr.
*Attorney, Agent, or Firm*—Lowe, Price, LeBlanc & Becker

[57] ABSTRACT

Carbon dioxide gas is fed in a metallic laser tube extending along an optical axis through a plurality of gas feeding tubes placed outside the optical axis and is taken out from the metallic laser tube by a blower to circulate the carbon dioxide gas, and the carbon dioxide gas held in the metallic laser tube is cooled by a gas cooling element. A pair of microwaves in which electric fields oscillated in different directions are induced are injected from a pair of gas injecting points of the gas feeding tubes close to the ends of the metallic laser tube and are combined in the metallic laser tube. Therefore, the carbon dioxide gas held in the metallic laser tube is uniformly excited by receiving the energy of the combined microwave, light is emitted from the excited carbon dioxide gas, the emitted light is repeatedly reflected along the optical axis by a total reflecting mirror and a partial reflecting mirror placed on both end sides of the metallic laser tube, and the emitted light passes through the partial reflecting mirror. Because the microwaves are injected from the gas injecting points placed outside the optical axis, the emitted light is stable resonated, a velocity of the carbon dioxide gas can be lowered, and a length of the metallic laser tube can be shortened.

11 Claims, 6 Drawing Sheets

GAS LASER OSCILLATING APPARATUS FOR DISCHARGING LASER BEAM BY EXCITING GAS WITH MICROWAVE

BACKGROUND OF THE INVENTION

1. Field of the Invention

The present invention relates to a small-sized gas laser oscillating apparatus for discharging a laser beam having a large output power by exciting gas with microwave.

2. Description of the Related Art

An example of a gas laser device using microwave is initially disclosed in a literature "Applied Physics Letter, 37(1980), p673", and many examples of the gas laser device have been disclosed (For example, Published Unexamined Japanese Patent Application No. H1-262681 (1989)). Up to now, a gas laser oscillating equipment with microwave is not put to practical use in a general industrial field.

In a laser oscillation, it is required to uniformly discharge a laser beam in all directions on a cross-sectional plane of a discharge tube. In case of an external discharge in which a laser beam is discharged by applying an electric field from outside the discharge tube, it is necessary to make uniform a distribution of the electric field applied to the discharge tube.

2.1. Previously Proposed Art

FIG. 1 is a schematic view of a conventional high frequency discharging apparatus.

In the discharge of the laser beam, as shown in FIG. 1, an alternating current generated by a high frequency current generating element 15 is applied to a pair of electrodes 16, an electric field is induced in a discharging zone 13 of a discharge tube 12 placed between the electrodes 16 at a high frequency up to one hundred and several tens MHz, and a pair of sheath layers 11 are generated between the discharge tube 12 and the discharging zone 13. In this case, when a displacement current locally flows in the discharging zone 13 to locally concentrate the discharge of the laser beam, the sheath layers 11 function as a ballast resistor to prevent the occurrence of the displacement current. Therefore, even though an intensity of the electric field applied to the discharging zone 13 is not uniformly distributed, the discharge of the laser beam can be stably performed.

However, as the frequency of the electric field is heightened, a thickness of each sheath layer 11 is thinned, and any sheath layer is not generated when the frequency of the electric field exceeds 200 MHz. Therefore, when it is tried to discharge a laser beam with a microwave of which a frequency is 2450 MHz, any sheath layer is not generated, and a uniform discharge of the laser beam required for a laser oscillation cannot be obtained unless the intensity of the electric field is more strictly made uniform.

To uniformly distribute the intensity of the electric field, a microwave generating unit 20 of a conventional laser beam discharging apparatus shown in FIG. 2 is used. In this microwave generating unit 20, two types of microwaves 21a and 21b in which oscillating directions of two types of induced electric fields differ from each other in a discharge tube 22 are generated in a pair of magnetrons 23a and 23b and are supplied in a waveguide 24. In this case, an electric field having a uniform intensity is induced in the discharge tube 22.

The discharge of a laser beam performed by exciting carbon dioxide gas with microwave in a conventional carbon dioxide gas laser oscillating apparatus in which a unit equivalent to the microwave generating unit 20 is used is described with reference to FIG. 3.

As shown in FIG. 3, two types of microwaves are generated in a pair of microwave generators 31 to induce two types of electric fields having different oscillating directions in a discharge space Sd of a discharge tube 32 having a length of 55 cm. The discharge tube 32 is made of a dielectric material such as glass and penetrates through the microwave generators 31 to receive the microwaves, and carbon dioxide gas existing in the discharge tube 32 is excited in the discharge space Sd by absorbing energy of the microwaves, and an excited energy of the carbon dioxide gas is emitted from the excited carbon dioxide gas in the discharge space Sd. A length of the discharge space Sd is set to 10 cm. An optical resonator 33 is composed of the discharge tube 32, a total reflecting mirror 34 arranged at one end of the discharge tube 32 and a partial reflecting mirror 35 arranged at the other end of the discharge tube 32. The excited energy is totally reflected by the total reflecting mirror 34 and is partially reflected by the partial reflecting mirror 35 to resonate a laser beam LB in the optical resonator 33, and the laser beam LB is discharged from the partial reflecting mirror 35. To cool the carbon dioxide gas heated by the microwaves, a cooling system 41 is arranged. That is, the cooling system 41 is composed of a gas intake tube 36 arranged in the center of the discharge tube 32, a first heat exchanger 37 for cooling the carbon dioxide gas transferred through the gas intake tube 36, a blower 38 for circulating the carbon dioxide gas, a second heat exchanger 39 for cooling the carbon dioxide gas circulated by the blower 38, and a pair of gas feeding tubes 40 for feeding the cooled carbon dioxide gas to the ends of the discharge tube 32. Therefore, the carbon dioxide gas is transferred in a direction indicated by an arrow G.

In the above configuration, when electric power of the microwaves is injected from the microwave generators 31 into the discharge pipe 32, glow discharge is generated in the discharge space Sd, the carbon dioxide gas flowing through the discharge pipe 32 is excited by receiving energy of the glow discharge, emitted light having an excited energy of the carbon dioxide gas is emitted from the excited carbon dioxide gas in the discharge space Sd, the emitted light is resonated in the optical resonator 33, and a laser beam LB is discharged from the partial reflecting mirror 35.

FIG. 4A shows a relationship between an injected electric power of microwaves and an output power of a laser beam obtained in the conventional carbon dioxide gas laser oscillating apparatus shown in FIG. 3, and FIG. 4B shows a relationship between an injected electric power of microwaves and an oscillating efficiency (a ratio of the laser output power to the injected electric power) of a laser beam obtained in the conventional carbon dioxide gas laser oscillating apparatus shown in FIG. 3.

As shown in FIGS. 4A and 4B, when a flow rate of the carbon dioxide gas is set to 2000 m$^3$/h, a maximum oscillating efficiency 20%, a maximum laser output power 1280 W and an oscillating efficiency 16% (1280/800*100) at an injected electric power 8 kW at which the maximum laser output power is obtained are obtained.

2.2. Problems to be Solved by the Invention

However, when the length of the discharge tube 32 is shortened from 55 cm to 40 cm, as shown in FIGS. 5A and 5B, the laser output power and the oscillating efficiency are decreased. For example, when a flow rate of the carbon dioxide gas is set to 2000 m$^3$/h, a maximum oscillating efficiency is decreased to 15%, a maximum laser output power is decreased to 1000 W and an oscillating efficiency is decreased to 12.5% at the injected electric power 8 kW at which the maximum laser output power is obtained. Also, when a flow rate of the carbon dioxide gas is decreased or the number of $CO_2$ molecules per unit time is decreased, the laser output power and the oscillating efficiency are decreased.

The reason that the laser output power and the oscillating efficiency are decreased when a flow rate of the carbon dioxide gas is decreased is described.

The output power of the laser beam is obtained when each $CO_2$ molecule of the excited carbon dioxide gas is transferred from an excited state to a ground (or a lower excited) state. Because all $CO_2$ molecules transferred to the excited state are immediately transferred to the ground or lower excited state, the output power of the laser beam depends on the number of $CO_2$ molecules transferred to the excited state per unit time. Also, because each $CO_2$ molecule is excited at a fixed probability, the output power of the laser beam depends on the number of $CO_2$ molecules flowing in unit time in the discharge space Sd. When a flow rate of the carbon dioxide gas is decreased, the number of $CO_2$ molecules per unit time is decreased. Accordingly, the laser output power is decreased when a flow rate of the carbon dioxide gas is decreased. Also, because the injected electric power is not changed, the oscillating efficiency is decreased when a flow rate of the carbon dioxide gas is decreased.

The reason that the laser output power and the oscillating efficiency are decreased when the length of the discharge tube 32 is shortened is described.

Each of the $CO_2$ molecules is excited when the $CO_2$ molecule is collided with an $N_2$ molecule placed at an upper energy state. In this case, a collision time of about 2 ms is required to make the collision between the $CO_2$ molecule and the $N_2$ molecule. In other words, it is required for each $CO_2$ molecule of the carbon dioxide gas to be held in the discharge space Sd for the collision time of about 2 ms or more. Therefore, when the length of the discharge tube 32 is shortened to a value more than a limit, because each $CO_2$ molecule is taken out from the discharge space Sd within 2 ms, the collision time of about 2 ms required for each $CO_2$ molecule cannot be obtained, and the laser output power and the oscillating efficiency are inevitably decreased.

Therefore, when the length of the discharge tube 32 is shortened from 55 cm to 40 cm, the laser output power and the oscillating efficiency are inevitably decreased unless a flow rate of the carbon dioxide gas is increased while setting a velocity of the carbon dioxide gas to a value higher than a limit.

To prevent the decrease of the laser output power and the oscillating efficiency, the extension of a discharge tube by a specified length determined by a pumping life of laser medium gas and an average gas flow velocity toward the downstream of a laser medium gas flow in the discharge tube from an end portion of a resonator is disclosed in the Published Unexamined Japanese Patent Application No. H4-14272 (1992). However, because a discharge tube which is considerably long as compared with a discharge space is required, there is a drawback that a laser oscillating equipment of the Application No. H4-14272 cannot be downsized while improving the oscillating efficiency.

SUMMARY OF THE INVENTION

An object of the present invention is to provide, with due consideration to the drawbacks of such a conventional gas laser oscillating apparatus, a gas laser oscillating apparatus in which an oscillating efficiency of a laser beam is heightened while downsizing the apparatus.

The object is achieved by the provision of a gas laser oscillating apparatus, comprising:

a plurality of microwave generating elements for generating a plurality of microwaves in which a plurality of oscillating directions of a plurality of electric fields differ from each other and injecting the microwaves into a plurality of gas feeding tubes placed outside an optical axis;

an optical resonator for combining the microwaves injected into the gas feeding tubes by the microwave generating elements to a combined microwave to uniformly distribute an intensity of the combined microwave in all directions on a plane perpendicular to the optical axis, uniformly exciting gas by adding an electric energy of the combined microwave to the gas, resonating light emitted from the excited gas by repeatedly transmitting the emitted light along the optical axis and discharging the emitted light as a laser beam;

a gas circulating element for circulating the gas placed in the optical resonator by returning the gas taken from the optical resonator to the optical resonator through the gas feeding tubes; and a gas cooling element arranged around the optical resonator for cooling the gas placed in the optical resonator.

In the above configuration, gas existing in the optical resonator is circulated by the gas circulating element by feeding the gas from the gas feeding tubes into the optical resonator. When a plurality of microwaves inducing a pair of electric fields oscillated in different directions are generated by the microwave generating elements and are injected into the gas feeding tubes placed outside an optical axis, the microwaves are transmitted in the optical resonator, and a combined microwave is produced. In this case, an intensity of the combined microwave is uniformly distributed in all directions on a plane perpendicular to the optical axis. Therefore, the gas is uniformly excited in the optical resonator by receiving an electric energy of the combined microwave, light is uniformly emitted from the excited gas, the emitted light is resonated by repeatedly transmitting the emitted light along the optical axis, and the emitted light is discharged as a laser beam.

In this case, the gas including the excited gas is cooled in the optical resonator by the gas cooling element. The reason that the gas including the excited gas is cooled in the optical resonator is described. The gas placed at a ground state is excited to an exciting state and the gas placed at the exciting state is transferred to a lower exciting state while emitting light. However, because it is difficult to transfer the gas placed at the lower exciting state to the ground state for the purpose of again exciting the gas, it is required to forcibly transfer the gas placed at the lower exciting state to the ground state. In the present invention, the gas including the excited gas is cooled in the optical resonator to forcibly transfer the gas placed at the lower exciting state to the ground state.

Accordingly, because the gas is excited by the combined microwave of which an intensity is uniformly distributed in all directions on a plane perpendicular to the optical axis, the gas can be uniformly excited in the optical resonator, and the laser beam can be obtained at a high quality.

Also, the gas is cooled by the gas cooling element while exciting the gas, the gas can be stably excited in the optical resonator, and the laser beam can be stably obtained.

Also, because the laser beam can be stably obtained, even though a velocity of the gas circulated in the optical resonator is lowered, the emitted light can be stably resonated in the optical resonator, and an oscillating efficiency of the laser beam can be heightened. Also, because a velocity of the gas circulated in the optical resonator can be lowered, a length of the optical resonator can be shortened, and the gas laser oscillating apparatus can be downsized.

Also, because the microwaves are not directly injected into the optical resonator but are injected into the gas feeding tubes placed outside an optical axis, a discharging zone in which the emitted light is produced and resonated can be efficiently occupied in the optical resonator because the discharging zone is not narrowed by the microwave generating elements. Accordingly, a length of the optical resonator can be shortened while maintaining the discharging zone, and the gas laser oscillating apparatus can be downsized.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a gas laser oscillating apparatus for discharging a laser beam by exciting gas with microwave according to the present invention are described with reference to drawings.

Figure 6:
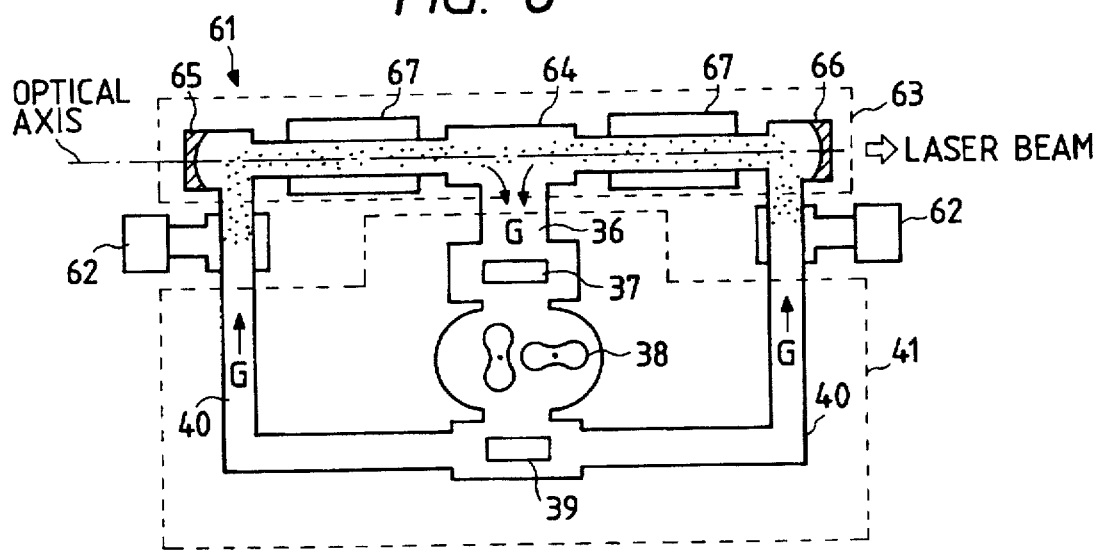
FIG. 6 is a constructional view of a carbon dioxide gas laser oscillating apparatus for discharging a laser beam by exciting carbon dioxide gas with microwave according to a first embodiment of the present invention.

FIG. 6 is a constructional view of a carbon dioxide gas laser oscillating apparatus for discharging a laser beam by exciting carbon dioxide gas with microwave according to a first embodiment of the present invention.

As shown in FIG. 6, a carbon dioxide gas laser oscillating apparatus 61 comprises a pair of microwave generating devices 62 arranged on the gas feeding tubes 40 for generating two types of microwaves in which oscillating directions of two types of induced electric fields differ from each other and injecting the microwaves into the gas feeding tubes 40, an optical resonator 63 for exciting $CO_2$ molecules of carbon dioxide gas by receiving the microwaves generated by the microwave generating devices 62, resonating light emitted from the excited $CO_2$ molecules of the carbon dioxide gas and discharging a laser beam, and the cooling system 41 for cooling the carbon dioxide gas.

The optical resonator 63 comprises a metal laser tube 64 arranged on an optical axis in which the intensity of an electric field induced by the microwaves injected into the gas feeding tubes 40 is uniformly distributed in all directions on a cross-sectional plane of the metal laser tube 64, the $CO_2$ molecules of the carbon dioxide gas are excited by the energy of the microwaves and the emitted light is generated, a total reflecting mirror 65 arranged at one end of the metal laser tube 64 for reflecting the emitted light transmitting on an optical axis and a partial reflecting mirror 66 arranged at the other end of the metal laser tube 64 for partially reflecting the emitted light reflected by the total reflecting mirror 65, and a gas cooling element 67 arranged around the metal laser tube 64 for cooling the carbon dioxide gas heated by the microwaves.

The metal laser tube 64 is made of aluminum or copper, and a length of the metal laser tube 64 is set to 40 cm. The gas feeding tubes 40 penetrate through the microwave generating devices 62, and the microwave generating devices 62 are placed on end portions of the gas feeding tubes 40.

Also, the microwave generating devices 62 is grounded. Therefore, any insulating distance between the metal laser tube 64 and each of the microwave generating devices 62 is not required, and the microwave generating devices 62 are placed close to both ends of the metal laser tube 1.

In the above configuration of the carbon dioxide gas laser oscillating apparatus 61, the carbon dioxide gas and nitrogen gas existing in the metallic laser tube 64 are circulated by the blower 38 by feeding the carbon dioxide gas and the nitrogen gas to the metallic laser tube 64 through the gas feeding tubes 40 while cooling the carbon dioxide gas and the nitrogen gas by the heat exchangers 37 and 39. When the microwaves generated by the microwave generating devices 62 are injected in both end portions of the gas feeding tubes 40 which is not placed on the optical axis, the nitrogen gas is uniformly excited by the microwaves in the end portions of the gas feeding tubes 40, the microwaves are combined in the metal laser tube 64 placed on the optical axis, and the intensity of an electric field induced by a combined microwave in the metal laser tube 64 is uniformly distributed in all directions on a cross-sectional plane perpendicular to the optical axis. Thereafter, the carbon dioxide gas is uniformly excited in the metal laser tube 64 according to the electric fields of the combined microwaves, emitted light is generated from the exciting energy of the excited carbon dioxide gas, the emitted light transmitting along the optical axis is repeatedly reflected by the total reflecting mirror 65 and the partial reflecting mirror 66 to resonate the emitted light, and a laser beam is stably discharged through the partial reflecting mirror 35.

In this case, the carbon dioxide gas including the excited carbon dioxide gas is cooled by the gas cooling element 67. The reason that the carbon dioxide gas is cooled in the metal laser tube 64 is described. Each of $CO_2$ molecules of the carbon dioxide gas placed at a ground state is excited to an exciting state and the $CO_2$ molecule placed at the exciting state is transferred to a lower exciting state placed at a level higher than the ground state while emitting light. However, because it is difficult to transfer the $CO_2$ molecule placed at the lower exciting state to the ground state for the purpose of again exciting the $CO_2$ molecule, it is required to forcibly transfer the $CO_2$ molecule placed at the lower exciting state to the ground state. In this embodiment, the carbon dioxide gas including the excited carbon dioxide gas is cooled in the metal laser tube 64 by the gas cooling element 67 to forcibly transfer the $CO_2$ molecule placed at the lower exciting state to the ground state.

Accordingly, because the carbon dioxide gas is cooled in the metal laser tube 64 and the carbon dioxide gas is uniformly excited in the metal laser tube 64, even though a flow rate of the carbon dioxide gas passing the metal laser tube 64 is lowered, the carbon dioxide gas is stably excited in the metal laser tube 64, the emitted light is stably resonated, and the laser beam is stably discharged from the carbon dioxide gas laser oscillating apparatus 61.

Also, because the metal laser tube 64 is made of a metal such as aluminum or copper, the carbon dioxide gas can be efficiently cooled by the gas cooling element 67 arranged around the metal laser tube 64. Therefore, the $CO_2$ molecules of the carbon dioxide gas can be efficiently excited.

Also, because the microwave generating devices 62 is arranged on the gas feeding tubes 40 not placed on the optical axis, a discharging zone in which the emitted light is produced and resonated can be efficiently arranged in the metal laser tube 64 because the discharging zone is not narrowed by the microwave generating devices 62. Accordingly, a length of the metal laser tube 64 can be shortened while maintaining the discharging zone, and the carbon dioxide gas laser oscillating apparatus 61 can be downsized.

Figure 7A:
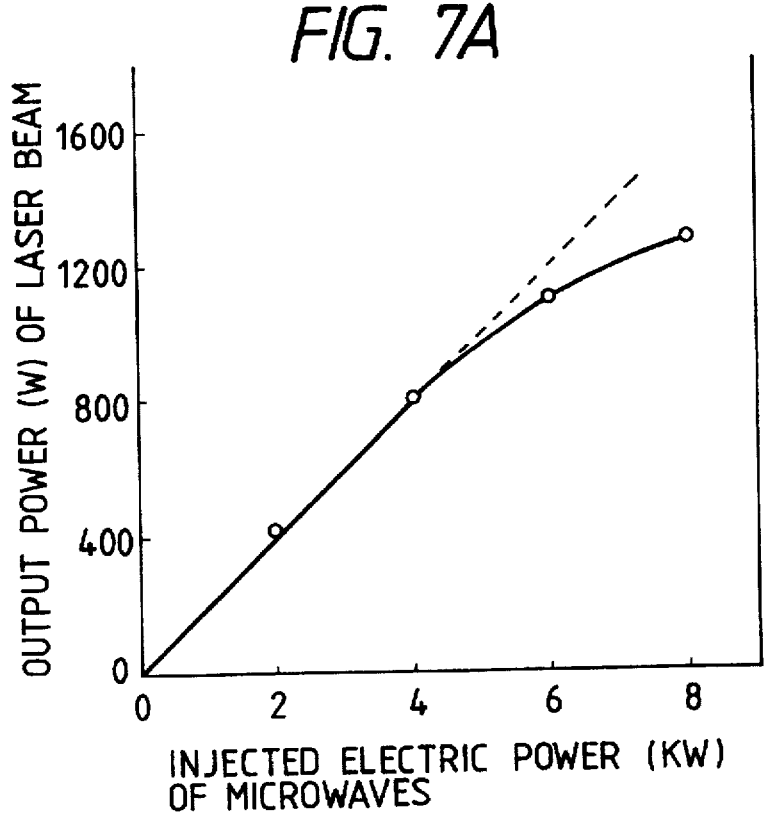
FIG. 7A shows a relationship between an injected electric power of microwaves and an output power of a laser beam obtained in the carbon dioxide gas laser oscillating apparatus shown in FIG. 6.
Figure 7B:
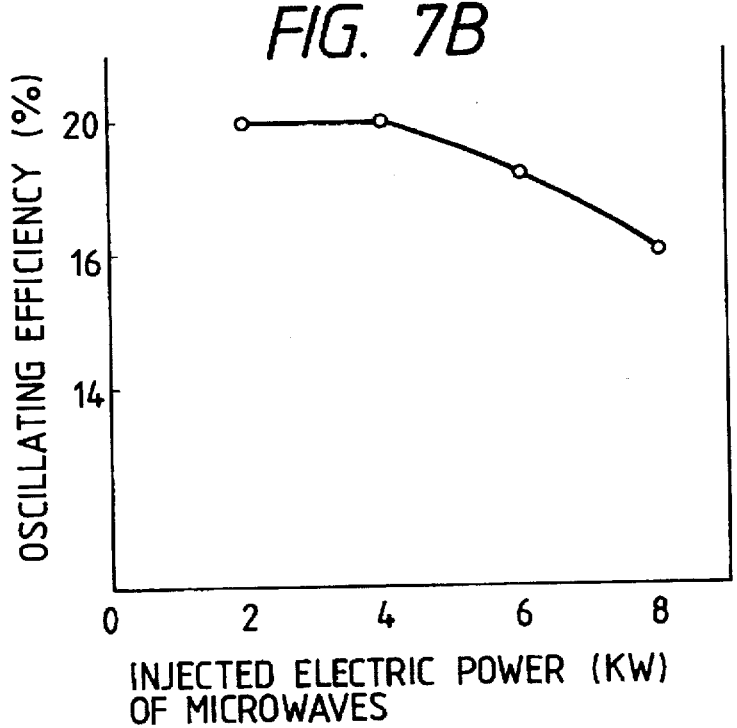
FIG. 7B shows a relationship between an injected electric power of microwaves and an oscillating efficiency (a ratio of the laser output power to the injected electric power) of a laser beam obtained in the carbon dioxide gas laser oscillating apparatus shown in FIG. 6.

FIG. 7A shows a relationship between an injected electric power of the microwaves and an output power of the laser beam obtained in the carbon dioxide gas laser oscillating apparatus shown in FIG. 6 in which a length of the metal laser tube 64 is set to 40 cm, and FIG. 7B shows a relationship between an injected electric power of the microwaves and an oscillating efficiency (a ratio of the laser output power to the injected electric power) of the laser beam obtained in the carbon dioxide gas laser oscillating apparatus shown in FIG. 6 in which a length of the metal laser tube 64 is set to 40 cm.

As shown in FIGS. 7A and 7B, even though a length of the metal laser tube 64 is shortened to 40 cm, a high laser output power and a high oscillating efficiency can be obtained in the same manner as those in the conventional carbon dioxide gas laser oscillating apparatus in which a length of the discharge tube 33 is set to 55 cm.

Figure 1:
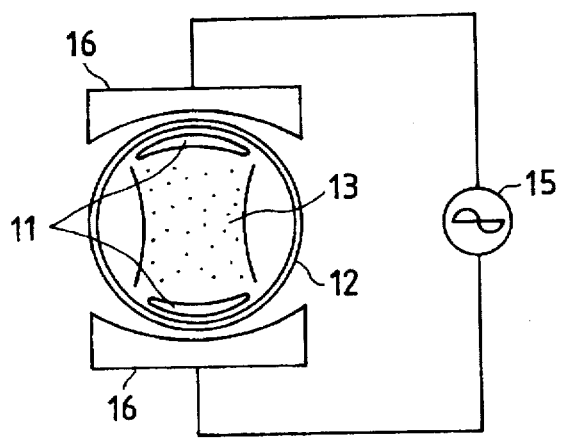
FIG. 1 is a schematic view of a conventional high frequency discharging apparatus.
Figure 2:
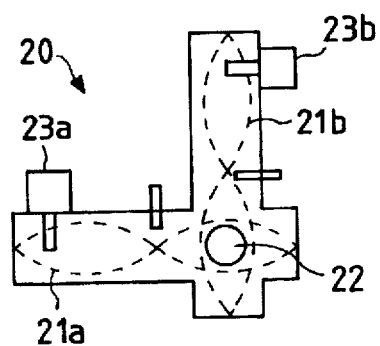
FIG. 2 is a schematic view of a microwave generating unit of a conventional laser beam discharging apparatus.
Figure 3:
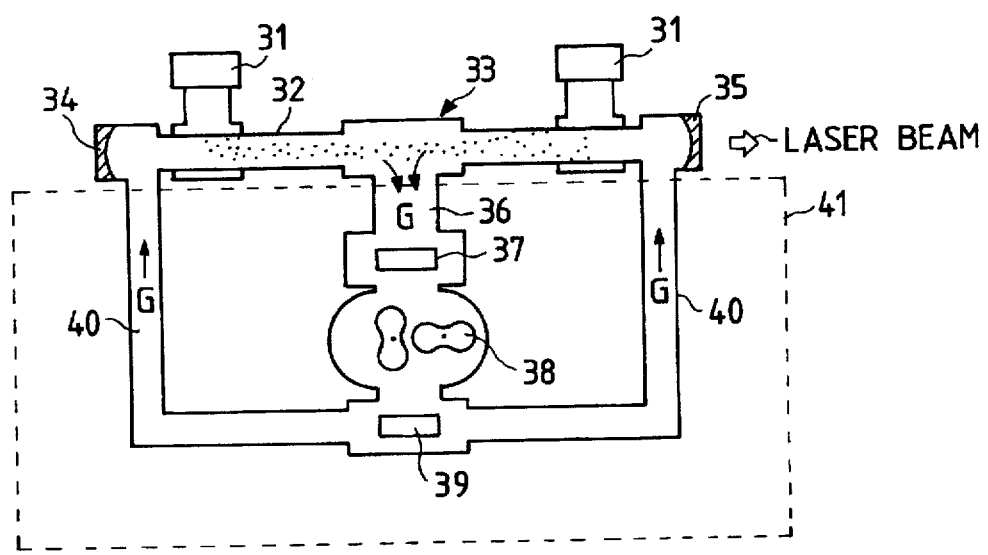
FIG. 3 is a schematic view of a conventional carbon dioxide gas laser oscillating apparatus for discharging a laser beam by exciting carbon dioxide gas with microwave.
Figure 4A:
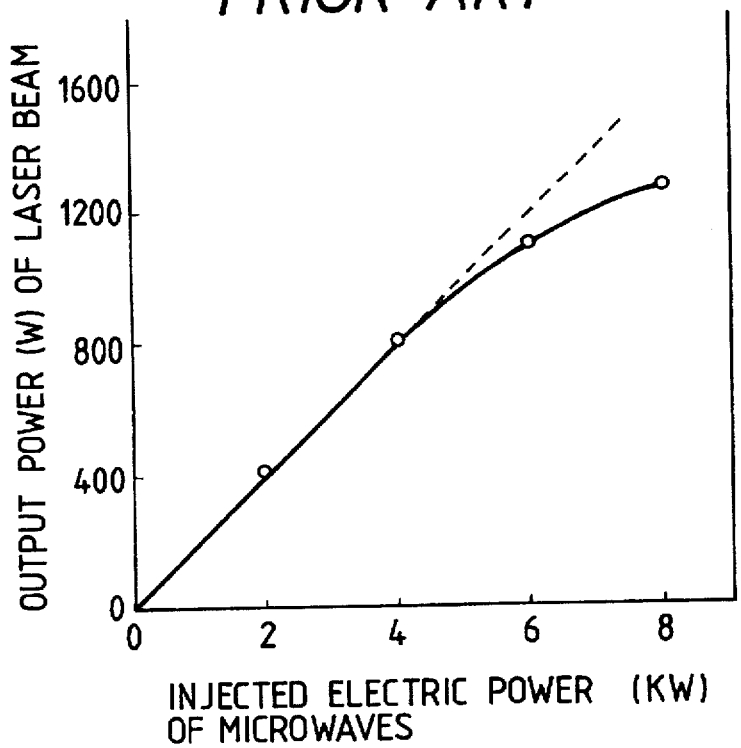
FIG. 4A shows a relationship between an injected electric power of microwaves and an output power of a laser beam obtained in the conventional carbon dioxide gas laser oscillating apparatus shown in FIG. 3.
Figure 4B:
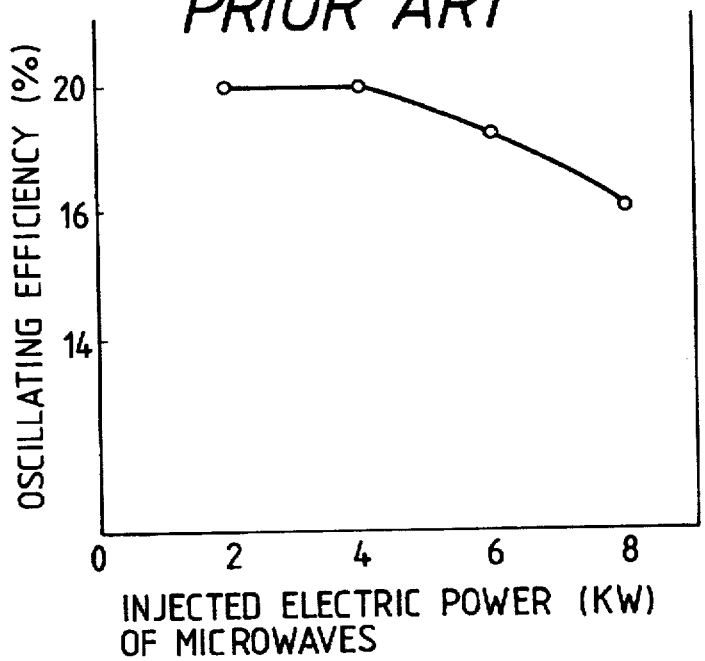
FIG. 4B shows a relationship between an injected electric power of microwaves and an oscillating efficiency (a ratio of the laser output power to the injected electric power) of a laser beam obtained in the conventional carbon dioxide gas laser oscillating apparatus shown in FIG. 3.
Figure 5A:
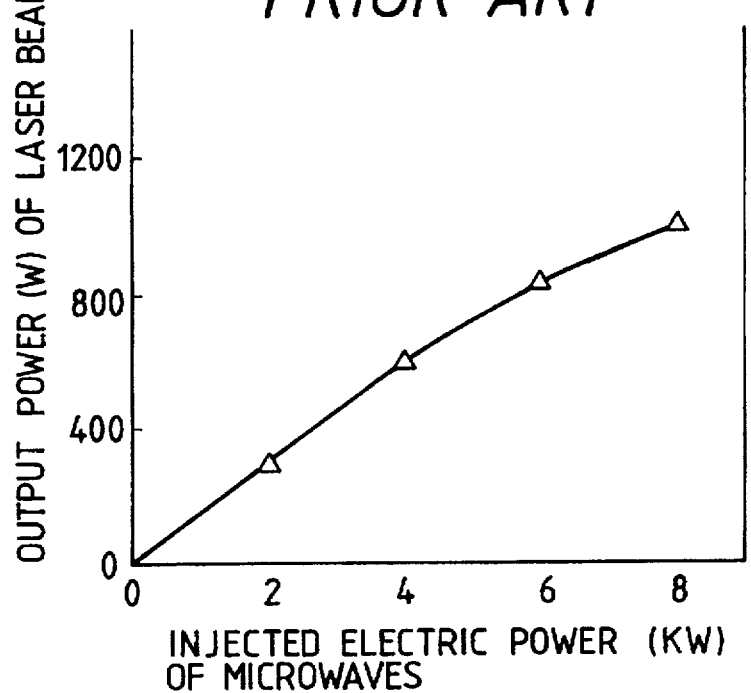
FIG. 5A shows a relationship between an injected electric power of microwaves and an output power of a laser beam obtained in another conventional carbon dioxide gas laser oscillating apparatus in which a length of a discharge tube is shortened.
Figure 5B:
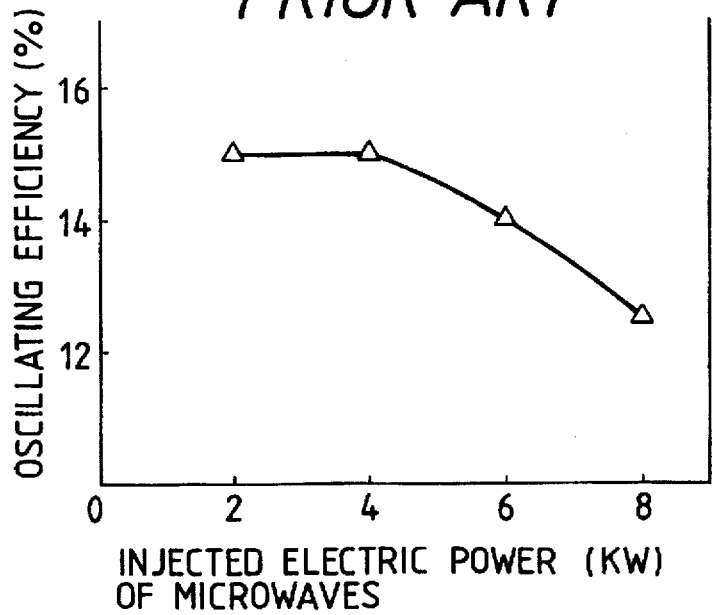
FIG. 5B shows a relationship between an injected electric power of microwaves and an oscillating efficiency (a ratio of the laser output power to the injected electric power) of a laser beam obtained in a conventional carbon dioxide gas laser oscillating apparatus in which a length of a discharge tube is shortened.

Accordingly, because a flow rate of the carbon dioxide gas passing the metal laser tube 64 can be lowered, a length of the metal laser tube 64 can be shortened as compared with that of the discharge tube 33 shown in FIG. 3 on condition that each $CO_2$ molecule of the carbon dioxide gas is held in the metal laser tube 64 for 2 ms or more.

Also, because the carbon dioxide gas can be uniformly excited in the metal laser tube 64 in stable, a cross-sectional area of the metal laser tube 64 can be widened. In this case, though a quality of the laser beam is degraded, because a flow rate of the carbon dioxide gas passing the metal laser tube 64 can be moreover lowered, a length of the metal laser tube 64 can be moreover shortened on condition that each $CO_2$ molecule of the carbon dioxide gas is held in the metal laser tube 64 for 2 ms or more.

In the first embodiment, because the microwaves are injected in both end portions of the gas feeding tubes 40 not placed on the optical axis, a small amount of $CO_2$ molecules are excited in the gas feeding tubes 40 by receiving a small amount of energy of the microwaves, and light emitted from the small amount of $CO_2$ molecules excited in the gas feeding tubes 40 is lost. However, because it takes an exciting time of about 2 ms to excite each $CO_2$ molecule by the collision with an $N_2$ molecule and the microwave generating devices 62 are placed close to both ends of the metal laser tube 1, the loss of the energy of the microwaves can be disregarded.

Also, the microwave generated in each of the microwave generating device 62 is injected in one end portion of the gas feeding tube 40 from a single microwave injecting point. However, in cases where each of the microwaves is injected from a plurality of microwave injecting points, an injected electric power of each microwave can be increased on condition that the intensity of an electric field induced by a combined microwave in the metal laser tube 64 is uniformly distributed. Therefore, a laser output power can be increased.

Figure 8:
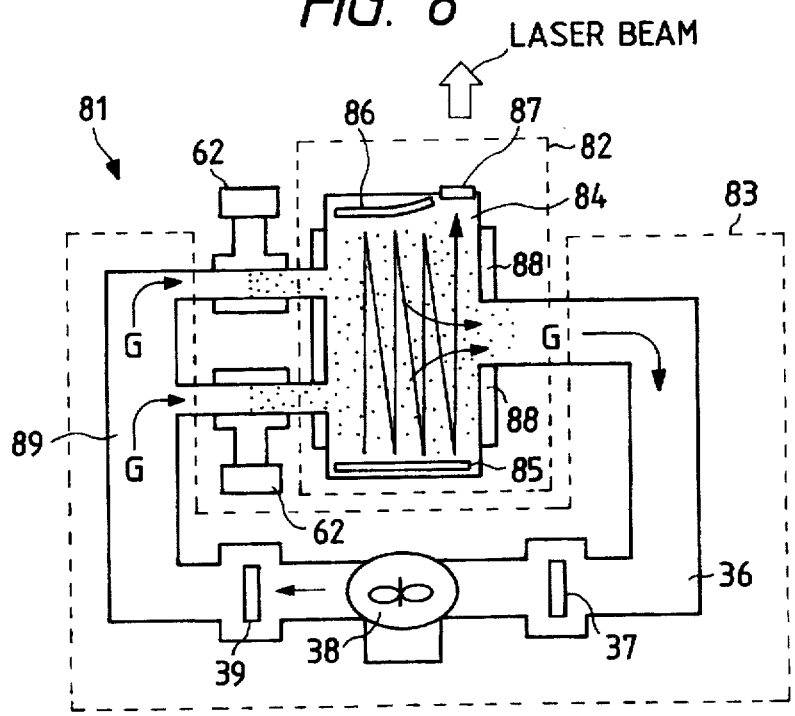
FIG. 8 is a constructional view of a carbon dioxide gas laser oscillating apparatus for discharging a laser beam by exciting carbon dioxide gas with microwave according to a second embodiment of the present invention.

FIG. 8 is a constructional view of a carbon dioxide gas laser oscillating apparatus for discharging a laser beam by exciting carbon dioxide gas with microwave according to a second embodiment of the present invention.

As shown in FIG. 8, a carbon dioxide gas laser oscillating apparatus 81 comprises the pair of microwave generating devices 62 arranged on a pair of branch tubes, an optical resonator 82 for exciting $CO_2$ molecules of carbon dioxide gas by receiving the microwaves generated by the microwave generating devices 62, resonating light emitted from the excited $CO_2$ molecules of the carbon dioxide gas and discharging a laser beam, and a cooling system 83 for cooling the carbon dioxide gas.

The optical resonator 82 comprises a metal chamber 84 in which the intensity of an electric field induced by the microwaves injected into the branch tubes is uniformly distributed in the metal chamber 84, the $CO_2$ molecules of the carbon dioxide gas are excited by the energy of the microwaves and the emitted light is generated, a flat reflecting mirror 85 arranged at one end of the metal chamber 84 for totally reflecting the emitted light, a curved reflecting mirror 86 arranged at the other end of the metal chamber 84 for totally reflecting the emitted light reflected by the flat reflecting mirror 85 while gradually shifting the emitted light transmitting on an optical axis from one side of the metal chamber 84 close to the microwave generating devices 62 to the other side of the metal chamber 84, an output mirror 87 arranged at the other end of the metal laser tube 64 for outputting the emitted light shifted on the other side of the metal chamber 84, and a gas cooling element 88 arranged around the metal chamber 84 for cooling the carbon dioxide gas heated by the microwaves. The metal chamber 84 is made of aluminum or copper, and a cross-sectional area of the metal chamber 84 on a plane perpendicular to a gas flowing direction is larger than that of the metal laser tube 64. That is, a size of the metal chamber 84 is 1.5 mm in height, 100 mm in width and 1000 mm in length.

The cooling system 83 comprises the gas intake tube 36 arranged on the other side of the metal chamber 84, the first heat exchanger 37, the blower 38, the second heat exchanger 38, and a gas feeding tube 89 for feeding the cooled carbon dioxide gas to the branch tubes on which the microwave generating devices 62 are arranged. Therefore, the carbon dioxide gas is transferred in a direction indicated by arrows G.

In the above configuration of the carbon dioxide gas laser oscillating apparatus 81 according to the second embodiment, the carbon dioxide gas and nitrogen gas existing in the metallic chamber 84 are circulated by the blower 38 by feeding the carbon dioxide gas and the nitrogen gas to the metallic chamber 84 through the gas feeding tube 89 and the branch tubes while cooling the carbon dioxide gas and the nitrogen gas by the heat exchangers 37 and 39. When the microwaves generated by the microwave generating devices 62 are injected into the branch tubes from a pair of gas injecting points close to one side of the metallic chamber 84, the nitrogen gas is excited by the microwaves, a combined microwave is formed in the metallic chamber 84 to uniformly distribute the combined microwave in the metal chamber 84, and the carbon dioxide gas is uniformly excited according to the electric fields of the combined microwave. Therefore, light emitted from the excited carbon dioxide gas is resonated in the metallic chamber 84 while being repeatedly reflected by the reflecting mirrors 85 and 86, and a laser beam is discharged through the output mirror 87. In this case, the carbon dioxide gas including the excited carbon dioxide gas is cooled by the gas cooling element 88 to efficiently excite the carbon dioxide gas. Also, the carbon dioxide gas flows in the metallic chamber 84 at a very low speed because a cross-sectional area of the metal chamber 84 on a plane perpendicular to a gas flowing direction is larger than that of the metal laser tube 64.

Accordingly, because a flow rate ($m^3/h$) of the carbon dioxide gas passing the metallic chamber 84 is maintained at a high value even though the carbon dioxide gas flows in the metallic chamber 84 at a very low speed, the carbon dioxide gas can be stably excited in the metallic chamber 84, the emitted light is stably resonated, and the laser beam can be stably discharged from the carbon dioxide gas laser oscillating apparatus 81 at a high efficiency.

Also, because the emitted light reflected by the reflecting mirrors 85 and 86 is shifted from one side of the metallic chamber 84 to the other side, an energy density of the emitted light is equal to that of the laser beam. That is, the energy density of the emitted light can be lowered as compared with that in the first embodiment. Therefore, because the energy of the laser beam applied on the output mirror 87 is considerably lower than that applied on the partial reflecting mirror 66 shown in FIG. 6 when an intensity of the laser beam discharged from the apparatus 81 is the same as that discharged from the apparatus 61, the laser beam having a high intensity can be discharged from the carbon dioxide gas laser oscillating apparatus 81.

Figure 9:
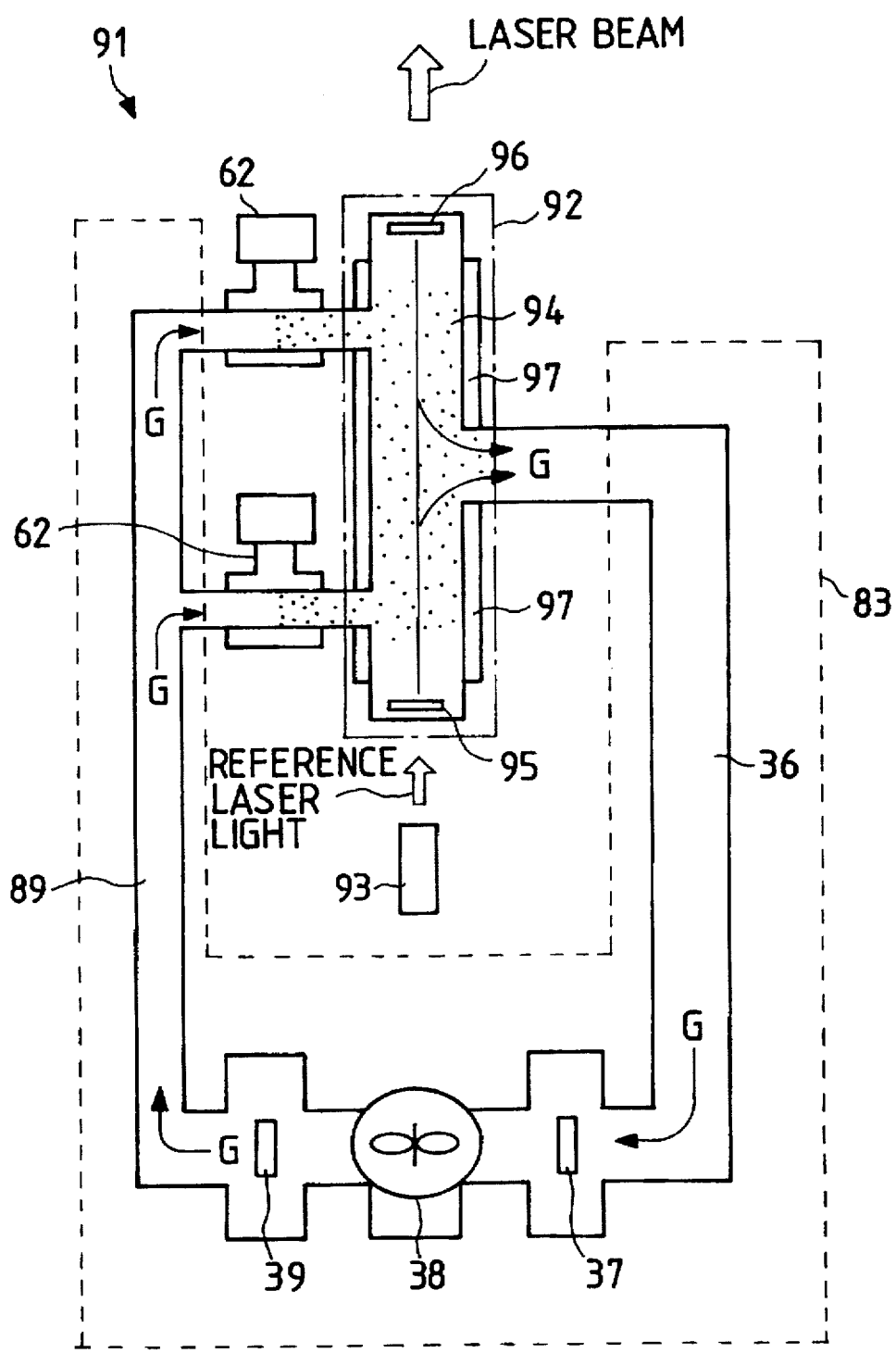
FIG. 9 is a constructional view of a carbon dioxide gas laser oscillating apparatus for discharging a laser beam by exciting carbon dioxide gas with microwave according to a third embodiment of the present invention.

FIG. 9 is a constructional view of a carbon dioxide gas laser oscillating apparatus for discharging a laser beam by exciting carbon dioxide gas with microwave according to a third embodiment of the present invention.

As shown in FIG. 9, a carbon dioxide gas laser oscillating apparatus 91 comprises the pair of microwave generating devices 62 arranged on the branch tubes, an optical resonator 92 for exciting $CO_2$ molecules of carbon dioxide gas by receiving the microwaves generated by the microwave generating devices 62, resonating light emitted from the excited $CO_2$ molecules of the carbon dioxide gas and discharging a laser beam, the cooling system 83, and a reference gas laser oscillating unit 93 for radiating a reference laser light in the optical resonator 92 to amplify the intensity of the reference laser light in the optical resonator 92.

The optical resonator 92 comprises a light amplifying chamber 94, a first total transmitting mirror 95 arranged at one end portion of the light amplifying chamber 94 for leading the reference laser light radiated from the reference gas laser oscillating unit 93 in the light amplifying chamber 94 to resonate the emitted light having the same frequency as that of the reference laser light in the light amplifying chamber 94, a second total transmitting mirror 96 arranged at the other end portion of the light amplifying chamber 94 for outputting the emitted light resonated in the light amplifying chamber 94. The light amplifying chamber 94 is made of aluminum or copper, and a cross-sectional area of the light amplifying chamber 94 on a plane perpendicular to a gas flowing direction is larger than that of the metal laser tube 64.

In the above configuration of the carbon dioxide gas laser oscillating apparatus 91 according to the third embodiment, the carbon dioxide gas and nitrogen gas existing in the light amplifying chamber 94 are circulated by the blower 38 by feeding the carbon dioxide gas and the nitrogen gas to the light amplifying chamber 94 through the gas feeding tube 89 and the branch tubes while cooling the carbon dioxide gas and the nitrogen gas by the heat exchangers 37 and 39. When the microwaves generated by the microwave generating devices 62 are injected into the branch tubes from a pair of gas injecting points close to one side of the light amplifying chamber 94, the nitrogen gas is initially excited in the branch tubes by the microwaves, and a combined microwave is formed in the light amplifying chamber 94 to uniformly distribute the combined microwave in the light amplifying chamber 94. Also, the carbon dioxide gas and the excited nitrogen gas flow in the light amplifying chamber 94 at a very low speed because a cross-sectional area of the light amplifying chamber 94 on a plane perpendicular to a gas flowing direction is larger than that of the metal laser tube 64. Also, reference laser light is radiated from the reference gas laser oscillating unit 93 in the light amplifying chamber 94 through the first total transmitting mirror 95. Therefore, the carbon dioxide gas is uniformly excited according to the electric fields of the combined microwave in the light amplifying chamber 94, emitted light having the same frequency as that of the reference laser light is emitted from the excited carbon dioxide gas, and the emitted light is resonated in the light amplifying chamber 94 to amplify the reference laser light. In this case, the carbon dioxide gas including the excited carbon dioxide gas is cooled by the gas cooling element 88 to efficiently excite the carbon dioxide gas. Thereafter, a laser beam is discharged from the carbon dioxide gas laser oscillating apparatus 91 to output the amplified reference laser light.

Accordingly, because the emitted light having the same frequency as that of the reference laser light is emitted from the excited carbon dioxide gas, the reference laser light can be amplified.

Also, because the emitted light is not repeatedly reflected by each of the total transmitting mirrors 95 and 96, a density of energy of the emitted light in the light amplifying chamber 94 is equal to that of the laser beam discharged from the carbon dioxide gas laser oscillating apparatus 91. Therefore, even though the laser beam has a large output power, because the energy of the emitted light applied on the second total transmitting mirror 96 is low, the laser beam having a high intensity can be stably obtained in the carbon dioxide gas laser oscillating apparatus 91.

Also, because the emitted light is not repeatedly reflected by each of the total transmitting mirrors 95 and 96, a laser beam having a superior quality can be obtained.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A gas laser oscillating apparatus, comprising:

a plurality of microwave generating elements for generating a plurality of microwaves in which a plurality of oscillating directions of a plurality of electric fields differ from each other and injecting the microwaves into a plurality of gas feeding tubes placed outside an optical axis;

an optical resonator for combining the microwaves injected into the gas feeding tubes by the microwave generating elements to a combined microwave to uniformly distribute an intensity of the combined microwave in all directions on a plane perpendicular to the optical axis, uniformly exciting gas by adding an electric energy of the combined microwave to the gas, resonating light emitted from the excited gas by repeatedly transmitting the emitted light along the optical axis and discharging the emitted light as a laser beam;

a gas circulating element for circulating the gas placed in the optical resonator by returning the gas taken from the optical resonator to the optical resonator through the gas feeding tubes; and a gas cooling element arranged around the optical resonator for cooling the gas placed in the optical resonator.

2. A gas laser oscillating apparatus according to claim 1 in which the optical resonator comprises:

a metallic laser tube in which the gas circulated by the gas circulating element is held, the microwaves are combined to the combined microwave, the gas is excited and the emitted light is produced;

a total reflecting mirror arranged on one end of the metallic laser tube for reflecting the emitted light produced in the metallic laser tube; and a partial reflecting mirror arranged on the other end of the metallic laser tube for partially reflecting the emitted light reflected by the total reflecting mirror to resonate the emitted light and passing the emitted light as the laser beam.

3. A gas laser oscillating apparatus according to claim 2 in which the metallic laser tube is made of aluminum or copper.

4. A gas laser oscillating apparatus according to claim 1 in which the optical resonator comprises:

a metallic chamber in which the gas transmitted from the gas feeding tubes is supplied to one side portion of the metallic chamber and is taken out from the other side portion of the metallic chamber by the gas circulating element, the microwaves are combined to the combined microwave, the gas is excited and the emitted light is produced;

a pair of reflecting mirrors arranged on both ends of the metallic chamber for reflecting the emitted light produced in the metallic chamber to resonate the emitted light; and an outputting mirror for passing the emitted light resonated by the reflecting mirrors as the laser beam.

5. A gas laser oscillating apparatus according to claim 4 in which one of the reflecting mirrors is a flat reflecting mirror and the other reflecting mirror is a curved reflecting mirror for repeatedly reflecting the emitted light reflected by the flat reflecting mirror while shifting the optical axis of the emitted light.

6. A gas laser oscillating apparatus according to claim 4 in which the metallic chamber is made of aluminum or copper.

7. A gas laser oscillating apparatus according to claim 1 in which the optical resonator comprises:

a reference laser light oscillating element for oscillating a reference laser light having a reference frequency;

a metallic chamber in which the gas transmitted from the gas feeding tubes is supplied to one side portion of the metallic chamber and is taken out from the other side portion of the metallic chamber by the gas circulating element, the microwaves are combined to the combined microwave, the gas is excited and an emitted light having the same frequency as that of the reference laser light oscillated by the reference laser light oscillating element is produced by radiating the reference laser light in the metallic chamber; and a pair of total transmitting mirrors arranged on both ends of the metallic chamber for passing the reference laser light oscillated by the reference laser light oscillating element in the metallic chamber and passing the emitted light along the optical axis as the laser beam.

8. A gas laser oscillating apparatus according to claim 7 in which the metallic chamber is made of aluminum or copper.

9. A gas laser oscillating apparatus according to claim 1 in which each of the microwaves generated by the microwave generating elements is injected into one gas feeding tube from one or more gas feeding points.

10. A gas laser oscillating apparatus according to claim 1 in which the microwave generating elements are grounded.

11. A gas laser oscillating apparatus according to claim 1 in which the gas is carbon dioxide gas.

* * * * *